(12) United States Patent
Gan et al.

(10) Patent No.: US 7,279,875 B2
(45) Date of Patent: Oct. 9, 2007

(54) HIGH SWITCHING FREQUENCY DC-DC CONVERTER WITH FAST RESPONSE TIME

(76) Inventors: Ge Gan, 1270 Oakmead Pkwy. #310, Sunnyvale, CA (US) 94085; Steven Huynh, 1270 Oakmead Pkwy. #310, Sunnyvale, CA (US) 94085

( * ) Notice: Subject to any disclaimer, the term of this patent is extended or adjusted under 35 U.S.C. 154(b) by 10 days.

(21) Appl. No.: 11/452,831

(22) Filed: Jun. 13, 2006

(65) Prior Publication Data

US 2007/0075695 A1    Apr. 5, 2007

Related U.S. Application Data

(60) Provisional application No. 60/691,456, filed on Jun. 16, 2005.

(51) Int. Cl.
*G05F 1/40* (2006.01)

(52) U.S. Cl. .................................................... 323/282
(58) Field of Classification Search ................ 323/382, 323/283, 284, 285, 351
See application file for complete search history.

(56) References Cited

U.S. PATENT DOCUMENTS

| 5,982,160 | A | * | 11/1999 | Walters et al. ............. 323/282 |
| 6,580,258 | B2 | * | 6/2003 | Wilcox et al. .............. 323/282 |
| 6,813,173 | B2 | * | 11/2004 | Lipcsei ........................ 363/98 |
| 7,132,820 | B2 | * | 11/2006 | Walters et al. ............. 323/288 |

* cited by examiner

*Primary Examiner*—Adolf Berhane (57) ABSTRACT

A hysteretic DC-DC converter is provided with high switching frequency, good load regulations, and fast load step response and in which the switching frequency is externally adjustable by a novel feedback network that enables substantial independence of duty cycle variation.

14 Claims, 5 Drawing Sheets

HIGH SWITCHING FREQUENCY DC-DC CONVERTER WITH FAST RESPONSE TIME

CROSS-REFERENCE TO RELATED APPLICATIONS

The present Utility patent application claims priority benefit of the U.S. provisional application for patent No. 60/691,456 filed on Jun. 16, 2005, under 35 U.S.C. 119(e).

The contents of this related provisional application are incorporated herein by reference.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone or the patent document or, patent disclosure as it appears in the Patent and Trademark Office, patent file or records, but otherwise reserves all copyright rights whatsoever.

FIELD OF THE INVENTION

The present invention relates generally to the field of DC-DC conversion integrated circuits (ICs). More particularly the invention relates to a hysteretic DC-DC converter with a high switching frequency.

BACKGROUND OF THE INVENTION

With the fast growth of portable electronics and equipments, the demand for a DC-DC converter that is lower in cost, higher in efficiency and requires smaller board area is also increasing. To use smaller external components, a high switching frequency is often required. However, it is often difficult to achieve higher switching frequency with the conventional constant-frequency current mode control due to the delays of the PWM comparison circuitry. The conventional control also has the drawback of slow load transient response, and the conventional control is difficult to compensate.

Figure 1:
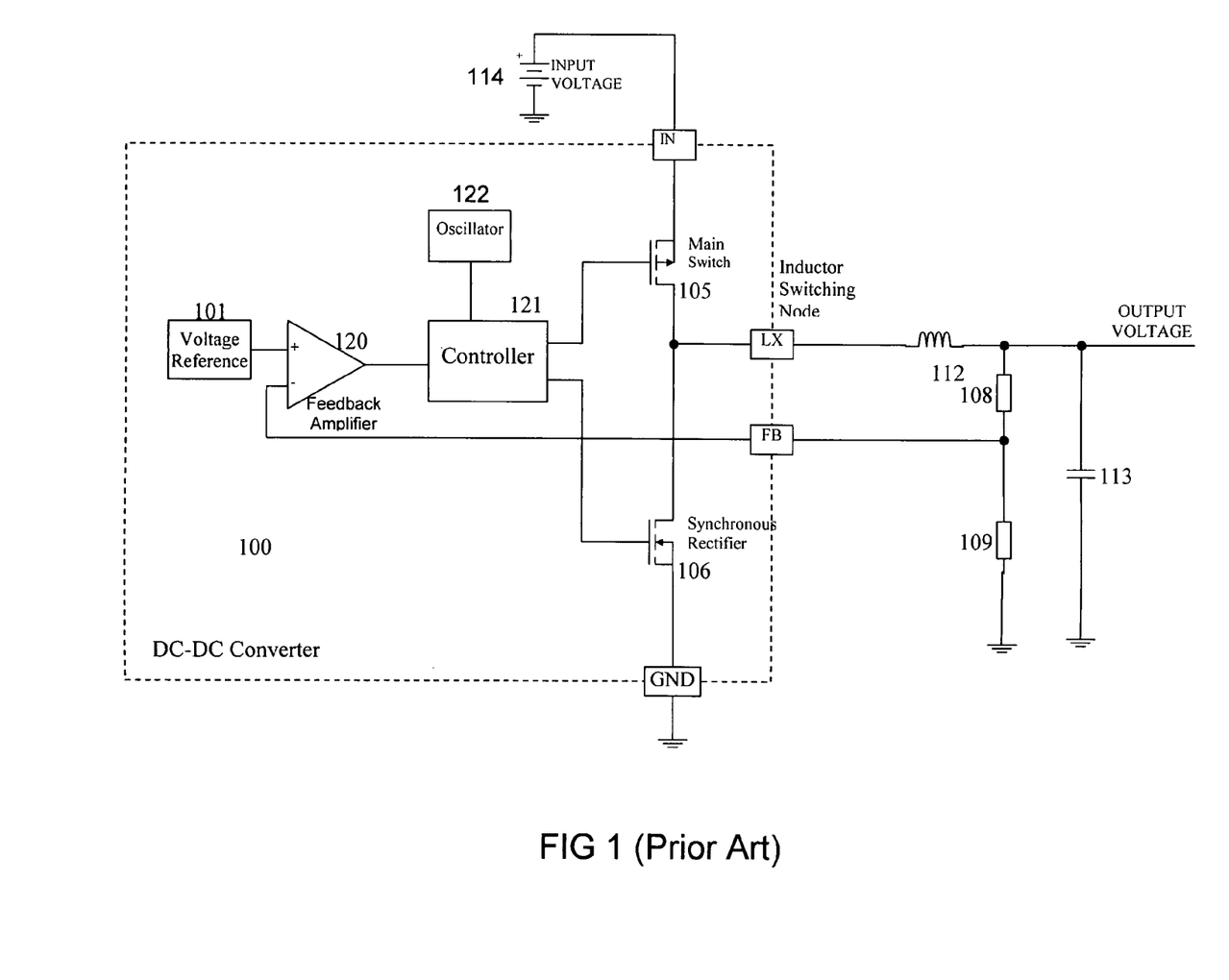
FIG. 1 illustrates an example of a conventional DC-DC converter.

A conventional DC-DC converter is shown in FIG. 1. In this circuit, a DC-DC converter IC 100 regulates an output voltage via a resistive feedback divider made up of resistors 108 and 109 between the output voltage and a ground node GND. A center tap of the resistive divider is connected to a feedback amplifier 120 that amplifies the difference between a feedback signal and a reference voltage from a voltage reference 101. The signal at the output of feedback amplifier 120 is then converted into a duty-cycle signal by a controller 121 that bases the switching frequency on an oscillator 122. This duty-cycle signal then drives a main switch 105 and a synchronous rectifier 106, generating a voltage pulse waveform at an inductor switching node LX. An inductor 112 and an output capacitor 113 act as a low pass filter to filter out the voltage pulse waveform to supply to the output. Because of the negative feedback effect, the output voltage is regulated so that the feedback voltage is essentially equal to the reference voltage.

The disadvantage of IC 100 is that to stabilize the feedback loop, the feedback gain must not be too high, especially at a frequency between 1 kilo-Hertz and 100 kilo-Hertz. This results in a slow response to the variation at the output voltage due to a sudden load change or input voltage change. The variation at the output is also first reduced through the resistive divider before going through the amplifier, resulting in a weaker signal for feedback. Furthermore, the delays in feedback amplifier 120 and controller 121 both result in a limitation on how high of a switching frequency the IC can operate.

Figure 2:
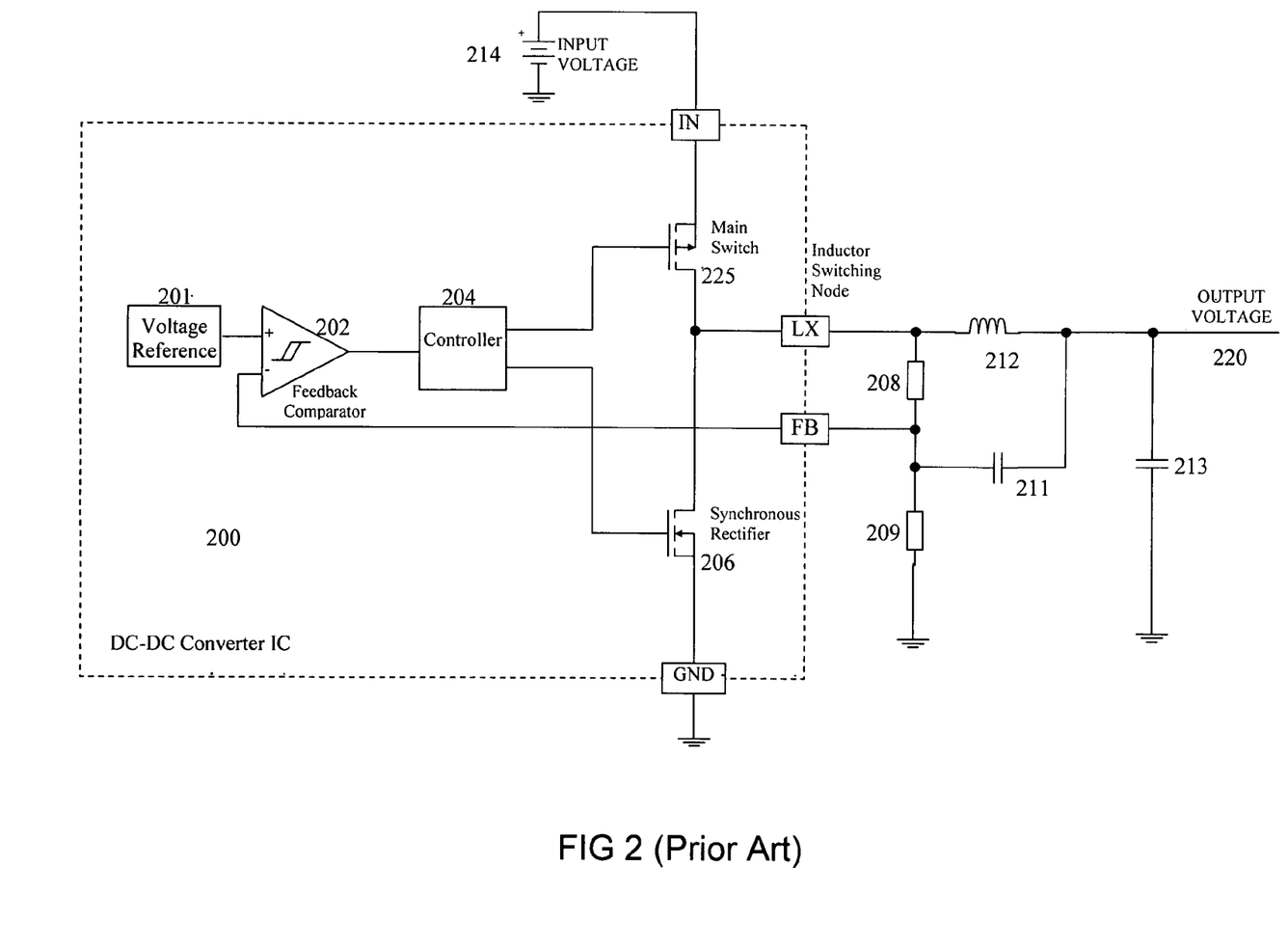
FIG. 2 illustrates an example of a prior art DC-DC converter that results in higher frequency operation than the circuit shown in FIG. 1.

FIG. 2 shows another example of a prior art DC-DC converter that results in higher frequency operation than the circuit shown in FIG. 1. In this architecture, a feedback resistor 208 is connected between an inductor switching node LX and a feedback node FB to provide a DC feedback path. In addition, a feed-forward capacitor 211 is connected between an output voltage 220 and a feedback voltage to provide a high frequency feedback path. A hysteretic feedback comparator 202 then compares the feedback voltage with a reference voltage from a voltage reference 201 and generates a signal to control a main switch 205 and a synchronous rectifier 206 via a controller 204. The response of this circuit is faster than the circuit of FIG. 1 because it is easier to stabilize, because the output voltage variation is forward-fed into the feedback node FB, and because there is less delay in the loop. In this circuit, the switching frequency is a function of feedback resistor 208, feed-forward capacitor 211, feedback comparator 202 hysteresis voltage, the input voltage 214, and output voltage 220.

Unfortunately, such conventional approaches as shown in FIG. 2 suffer from the problem that the output voltage is sensitive to the resistance of an inductor 212 and the switching, frequency varies with the input and output voltages. Since the DC feedback point is set by the resistive dividers from the inductor switching node LX, the output voltage changes by a value equal to $R_{IND} * I_{OUT}$, where $R_{IND}$ is the DC resistance of inductor 212, and $I_{OUT}$ is the output current. For instance, assuming a typical inductor resistance of 100 mΩ and an output Current of 1A, the voltage drop or load regulation is 100 mV, which is unacceptable in many applications.

In view of the foregoing, there is a need for a solution to achieve a high switching frequency that is relatively constant and has significantly reduced load regulation by introducing a duty-cycle-controlled hysteretic switching scheme and by using a unique feedback network.

BRIEF DESCRIPTION OF THE DRAWINGS

The present invention is illustrated by way of example, and not by way of limitations, in the figures of the accompanying drawings and in which like reference numerals refer to similar elements and in which.

Unless otherwise indicated illustrations in the figures are not necessarily drawn to scale.

SUMMARY OF THE INVENTION

To achieve the forgoing and other objects and in accordance with the purpose of the invention, a technique for a fast load step response switching regulator is described.

High switching frequency in DC-DC converters is desirable to enable the use of relatively small external components to thereby save printed circuit board area. However, using conventional methods to achieve high switching frequency typically imposes a limitation on duty cycle range due to response delays of the amplifying and comparison circuitry, which also slows load transient response times.

In one embodiment of the present invention, a hysteretic DC-DC converter is provided with high switching frequency, good load regulation, and fast load step response, and in which the switching frequency is externally adjustable by the feedback network and is essentially independent of duty cycle variation. This dc-dc converter embodiment has a feedback network that includes the following circuit nodes: a switching node; a converter output node; a ground node; and a feedback node; and, the following resistors: a resistor electrically coupled between the output node and the feedback node; a resistor electrically coupled between the switching node and the feedback node; and a resistor coupled between the feedback node and the ground node.

In some embodiments, the dc-dc converter feedback network further includes a feed-forward capacitor electrically coupled between the output node and the feedback node.

Means are also provided in some embodiments for detecting the feedback voltage in the feedback node; such as, but not limited to a hysteretic comparator associated with the dc-dc converter feedback network, where an input of the hysteretic comparator is electrically coupled to the feedback node. Depending upon the implementation needs, in alternative embodiments the hysteresis value of the hysteretic comparator is at least partially determined based on the switching duty cycle of the switching dc-dc converter.

Embodiments (e.g., a power management product) also are provided that include an integrated circuit (IC) associated with the dc-dc converter feedback network in which at least one (or all) of the resistors or the capacitor in the feedback network, and/or the feedback voltage detector is integrated with the IC.

In some embodiment, means are also provided for creating a feedback signal at the feedback node that is at least partially dependant on the switching duty cycle of the switching dc-dc converter and the output voltage at the switching node. Such embodiments may further include means for detecting the feedback voltage in the feedback node, where in some implementations, the feedback voltage detecting means includes hysteresis and means for making the hysteresis at least partially based on the switching duty cycle of the switching dc-dc converter.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive.

The present invention will now be described in detail with reference to embodiments thereof as illustrated in the accompanying drawings.

Figure 3:
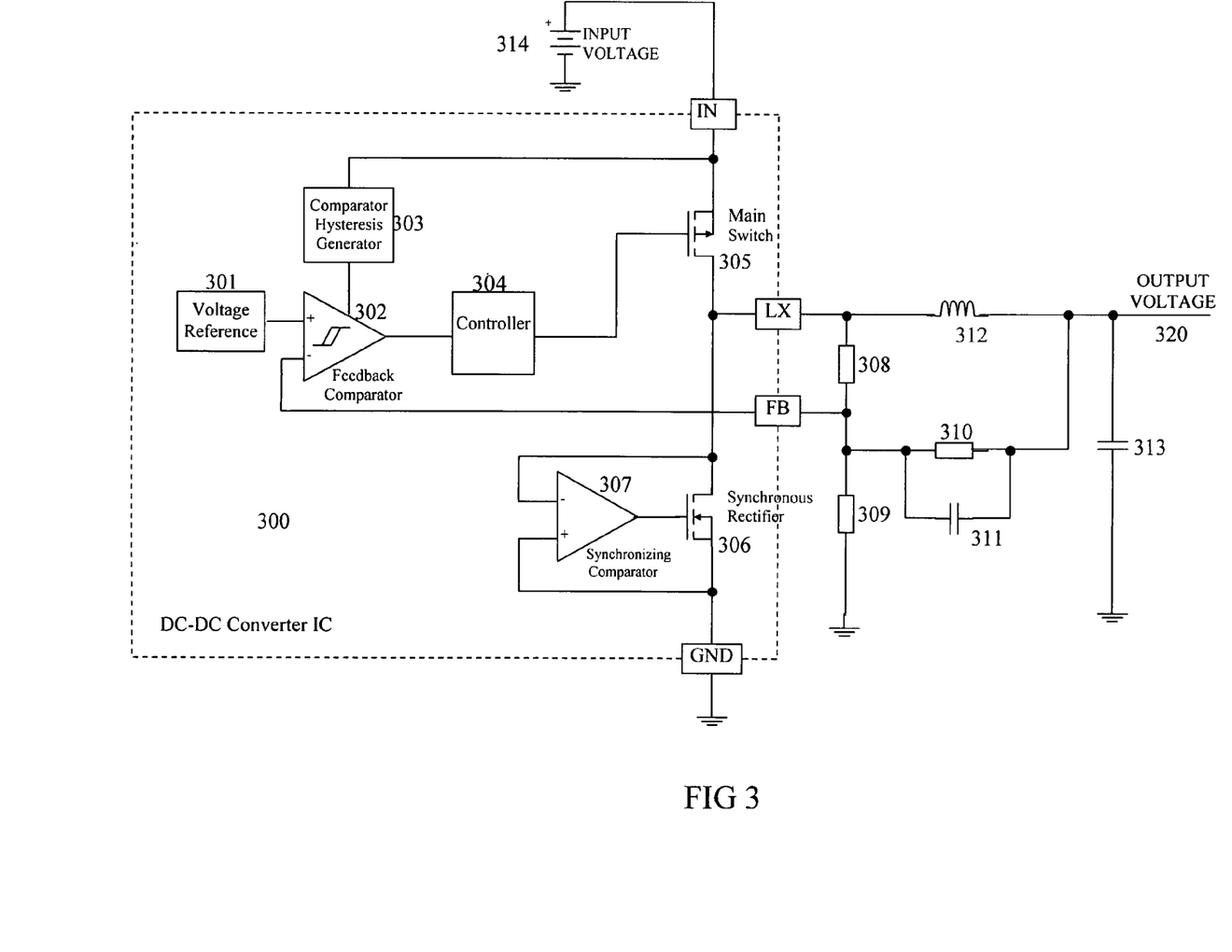
FIG. 3 illustrates an exemplary hysteretic DC-DC converter with an external feedback network, in accordance with an embodiment of the present invention.

A control scheme will next be described in accordance with an embodiment of the present invention, which is comprised of a duty-cycle-controlled hysteretic comparison and a unique feedback network. FIG. 3 illustrates an exemplary embodiment of the present invention. A resistor 308 is connected between an inductor switching node LX and a feedback node FB, a resistor 310 and a capacitor 311 are connected between an output node and feedback node FB, and a resistor 309 is connected between feedback node FB and a ground GND. Resistor 308 provides the fast-signal path to enhance loop stability and response. The output voltage is determined by resistors 308 and 310. However, by choosing a lower resistance value for resistor 310, the output voltage is more predominantly determined by resistor 310, making the output voltage less sensitive to the resistance of an inductor 312. For the exemplary inductor resistance of 100 mΩ and an output current of 1A, the load regulation is 100 mV*$R_{310}/(R_{310}+R_{308})$=20 mV if $R_{310}$ is ¼ of $R_{308}$.

By partly talking the feedback signal from the inductor switching node through resistor 308, the usual phase lag due to talking feedback signal exclusively from the output capacitor is eliminated, making the control loop exceedingly stable and allowing the use of a very small ceramic output capacitor 313.

The feed-forward capacitor 311, resistor 308, feedback comparator 302 hysteresis, and the switching duty cycle determine the switching frequency. An aspect of the present invention is to provide a method for making the switching frequency relatively independent of duty cycle, and hence of the input voltage. This relative independence is achieved in one approach by making the hysteresis proportional to the equation (1-D), where D is the switching duty cycle.

FIG. 3 illustrates an exemplary hysteretic DC-DC converter with an external feedback network, in accordance with an embodiment of the present invention. In the present embodiment, an IC 300 comprises a feedback resistor 308 that is connected between an inductor switching node LX and a feedback node FB to provide a DC feedback path. In addition, a feed-forward capacitor 311 and a resistor 310 are connected between an output voltage node 320 and feedback node FB. A resistor 309 is connected between feedback node FB and a ground node GND. A hysteretic feedback comparator 302 compares a feedback voltage to a reference voltage from a voltage reference source 301, if the feedback voltage drops below the reference voltage, feedback comparator 302 signals an "ON" cycle. During the "ON" cycle, a hysteresis voltage from a comparator hysteresis generator 303 is added to the reference as the new threshold of feedback comparator 302. The "ON" cycle also turns on a main switch 305 to route an inductor current into the output voltage, bringing up tile output voltage. When the feedback voltage climbs back above the reference voltage plus the hysteresis voltage and a minimum "on" time is exceeded, a signal will turn off main switch 305 and IC 300 enters an "OFF" cycle. A synchronous rectifier 306 will then turn on to "catch" the current of an inductor 312 until either main switch 305 turns on again or the current of inductor 312 discharges to essentially zero. Synchronous rectifier 306 is also connected to a synchronizing comparator 307. Synchronizing comparator 307 compares the voltage of node LX to that of node GND, which essentially determines the direction of the current flow through synchronous rectifier 306. To help avoid discharging the output voltage to the GND node, comparator 307 turns off synchronous rectifier 306 before the current changes direction of flowing from the GND node to the LX node to flowing, instead, from the LX node the to GND node.

Figure 4:
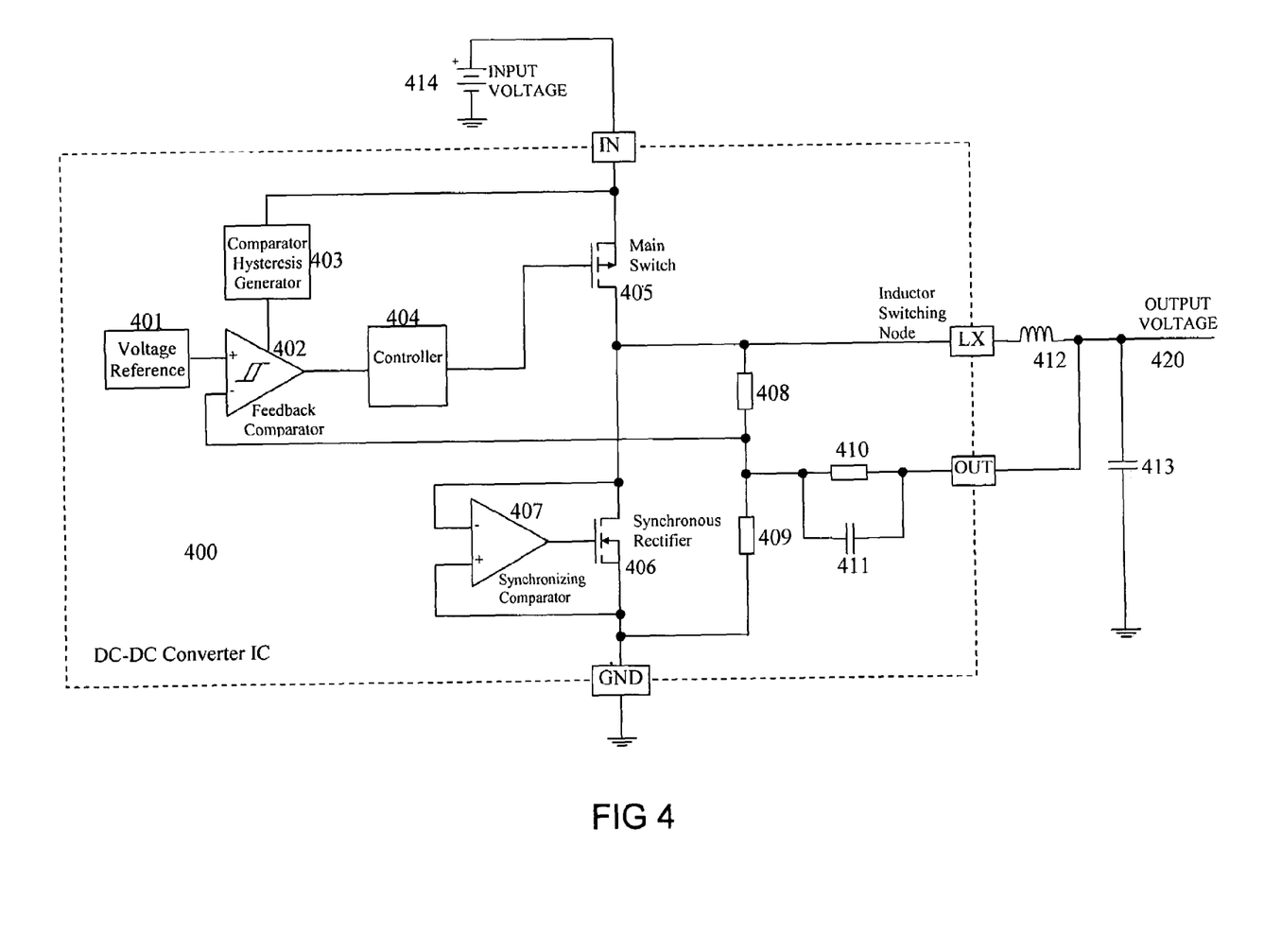
FIG. 4 illustrates an exemplary hysteretic DC-DC converter with an integrated feedback network, in accordance with an embodiment of the present invention.

The control scheme of the present embodiment comprises a duty-cycle-controlled hysteretic comparison and a unique feedback network. Resistor 308 provides a fast signal path to enhance loop stability and response. The output voltage is determined by resistors 308, 309 and 310. However, by choosing a lower resistance value for resistor 310, the output voltage is more predominantly determined by resistor 310, making the output voltage less sensitive to the resistance of inductor 312. For example, without limitation, for an inductor resistance of 100 mΩ and an output current of 1A, the load regulation is 100 mV*$R_{310}$/($R_{310}$+$R_{308}$)=20 mV if $R_{310}$ is ¼ of $R_{308}$. Where $R_{308}$ and $R_{310}$ represent the resistance of resistors 308 and 310, respectively. In alternate embodiments one or more of the resistors and/or the capacitor comprising the feedback network may be integrated into the IC. For example, without limitation, FIG. 4 illustrates an exemplary IC 400 where all of the resistors and the capacitor of the feedback network are integrated into IC 400.

By partly talking the feedback signal from inductor switching node LX through resistor 308 in the present embodiment, the usual phase lag due to taking the feedback signal exclusively from an output capacitor 313 is eliminated, making the control loop exceedingly stable and allowing the use of a very small ceramic output capacitor in the preferred embodiment. Feed-forward capacitor 311, resistor 308, feedback comparator 302 hysteresis, and the switching duty cycle determine the switching frequency. The present embodiment proposes a method for making the switching frequency relatively independent of duty cycle, and hence of the input voltage, by making the hysteresis proportional to (1-D), where D is the switching duty cycle.

In the following formulas the capacitance of capacitor 311 is represented by $C_{311}$, and the resistances of resistors 308, 309 and 310 are represented as $R_{308}$, $R_{309}$ and $R_{310}$, respectively. Designating the input voltage from an input voltage source 314 as $V_{IN}$, the output voltage at output voltage node 320 as $V_{OUT}$, comparator hysteresis voltage as $V_{HYS}$, reference voltage as $V_{REF}$, and the "ON" cycle time and "OFF" cycle time as $T_{ON}$ and $T_{OFF}$, respectively, the switching frequency can be derived via the following procedure:

During the "ON" cycle, $$C_{311}*V_{HYS}/T_{ON}=(V_{IN}-V_{REF})/R_{308}+(V_{OUT}-V_{REF})/R_{310}-V_{REF}/R_{309} \quad (1)$$

$$V_{OUT}=V_{REF}*[1+R_{308}*R_{310}/(R_{308}+R_{310})/R_{309}] \quad (2)$$

Combining (1) and (2), the on time, $T_{ON}$ may be obtained as:

$$T_{ON}=C_{311}*V_{HYS}*R_{308}/(V_{IN}-V_{OUT}) \quad (3)$$

Similarly, during the "OFF" cycle, the off time, $T_{OFF}$, may be obtained as:

$$T_{OFF}=C_{311}*V_{HYS}*R_{308}/V_{OUT} \quad (4)$$

$$\text{Period}=T_{ON}+T_{OFF}=C_{311}*V_{HYS}*R_{308}*(1/(V_{IN}-V_{OUT})+1/V_{OUT}) \quad (5)$$

$$\text{Frequency}=1/\text{Period}=V_{OUT}(1-V_{OUT}/V_{IN})/(C_{311}*V_{HYS}*R_{308}) \quad (6)$$

As can be seen from equation (6), the switching frequency can be made to be independent of the duty cycle variation if the hysteresis is made proportional to $1-V_{OUT}/V_{IN}$. Since in most applications, the accuracy requirement on the switching frequency is no more than +/−10% to +/−20%, a piecewise curve-fitting approach can be used to approximate $1-V_{OUT}/V_{IN}$.

In an alternative approach to FIG. 3, which shows an embodiment of the present invention with the feedback network external to the IC, FIG. 4 illustrates an exemplary configuration where the feedback network is integrated into the IC, in accordance with alternative embodiment of the present invention.

FIG. 4 illustrates an exemplary hysteretic DC-DC converter with an integrated feedback network, in accordance with an embodiment of the present invention. In the present embodiment, IC 400 is constructed similarly to the embodiment shown by way of example in FIG. 3 except that the feedback network of the present embodiment is integrated into IC 400. IC 400 comprises a feedback resistor 408 that is connected between an inductor switching node LX and an out node OUT. A hysteretic feedback comparator 402 compares a feedback voltage to a reference voltage from a voltage reference source 401, if the feedback voltage drops below the reference voltage, feedback comparator 402 signals an "ON" cycle. During the "ON" cycle, a hysteresis voltage from a comparator hysteresis generator 403 is added to the reference voltage as a new threshold for feedback comparator 402. The "ON" cycle also turns on a main switch 405 to route an inductor current from an inductor 412 into an output, bringing up an output voltage 420. When the feedback voltage climbs back above the reference voltage plus the hysteresis voltage and a minimum "on" time is exceeded, a signal will turn off main switch 405 and IC 400 enters an "OFF" cycle. A synchronous rectifier 406 will then turn on to "catch" the current of inductor 412 until either main switch 405 turns on again or the current of inductor 412 discharges to essentially zero. Synchronous rectifier 406 is also connected to a synchronizing comparator 407 in conventional zero-drop diode configuration.

Figure 5:
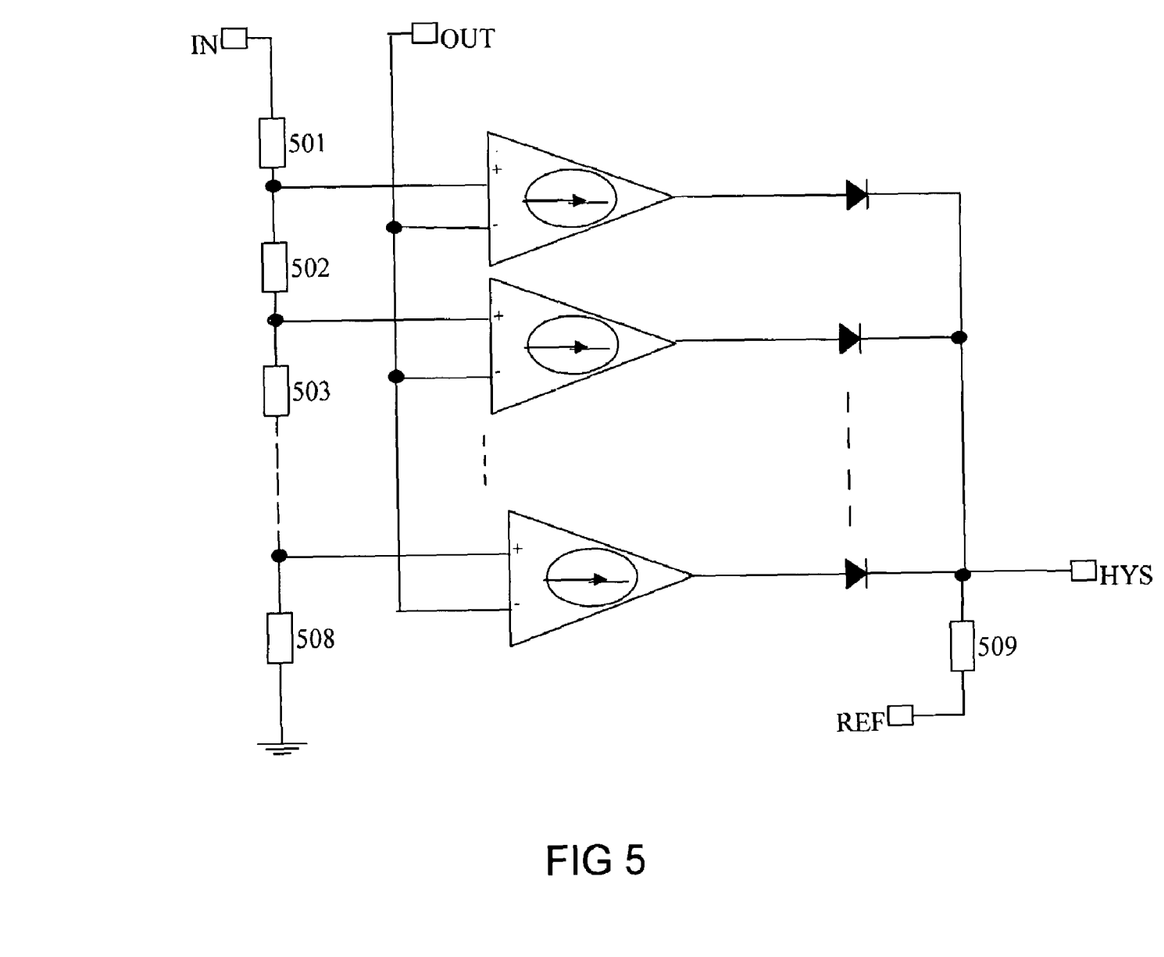
FIG. 5 shows exemplary circuitry to achieve hysteresis, in accordance with an embodiment of the present invention.

FIG. 5 shows exemplary circuitry to achieve adaptive hysteresis, in accordance with an embodiment of the present invention. The present embodiment generates hysteresis that is approximately proportional to $1-V_{OUT}/V_{IN}$. An input voltage, $V_{IN}$, is divided down by a voltage divider network to different levels set by resistors 501, 502, 503, etc, relative to a base divider resistor 508. The error between each level and an output voltage, $V_{OUT}$, is amplified and generates a current that, if positive, goes into a summing resistor 509 to generate the hysteresis voltage, $V_{HYS}$, which is the output of hysteresis generator 403 in FIG. 4. For example, without limitation, to achieve +/−10% control on the frequency, approximately Five levels can be used to generate $V_{HYS}$=20%, 40%, 60%, 80%, and 100% of maximum value between these levels. The maximum $V_{HYS}$ value can be between 10 mV and 30 mV for example in a typical embodiment. In alternate embodiments, more levels or fewer levels or resistors may be used to create a variety of hysteresis voltages.

Depending upon the needs of the particular invention, those skilled in the art will readily recognize, in light of the teachings of the present invention, a multiplicity of alternate and suitable ways to implement the adaptive hysteresis. By way of example, and not limitation, instead of tie proportional hysteresis adaptive scheme described above, other suitable linear or nonlinear functions may be instead implemented. Similarly, the resistor divider levels need not be linearly spaced if a non-uniform hysteresis response is desired. Also, difference voltage (Vout−Vin) amplifiers are shown conceptually as operational amplifiers, but any suitable electronics may be implemented. For example, without limitation, proportional hysteresis output HYS may be generated by a single simple linear amplifier (e.g., an operational amplifier), albeit at the cost of having the control of the levels for frequency control granularity. It should be noted that while a simple amplifier that converts difference voltage (Vout−Vin) to the hysteresis voltage can be implemented, not all the applications provide the required Vout information to the IC directly. In the case of external feedback control, only the resistor divided version of Vout is available to the IC through FB pin. Therefore, one can indirectly sense (Vout−Vin) by, for instance, sense the slope of the inductor current during turn on (L*dl/dt=Vin−Vout), or by averaging voltage at node LX to obtain Vout because average voltage at node LX is essentially Vout. In such cases, for example, the difference voltage (Vout−Vin) can be easily obtained using a operational amplifier.

In alternate embodiment of the present invention, the hysteresis correction means may be based on a look up table approach instead of the analog techniques described.

Having fully described at least one embodiment of the present invention, other equivalent or alternative means for implementing a fast and high switching frequency DC-DC converter according to the present invention will be apparent to those skilled in the art. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A high switching frequency dc-dc converter having a feedback network comprising:
   a switching node;
   a converter output node;
   a ground node;
   a feedback node;
   a first resistor electrically coupled between said output node and said feedback node;
   a second resistor electrically coupled between said switching node and said feedback node;
   a third resistor electrically coupled between said feedback node and the ground node;
   a hysteretic comparator associated with said dc-dc converter feedback network, comprising an input being electrically coupled to said feedback node; and
   a hysteresis generator for controlling a hystersis value of said hysteretic comparator, at least partially based on the switching duty cycle of the switching dc-dc converter, in a manner such that variations in switching frequency of the switching dc-dc converter due to variations in switching duty cycle are mitigated.

2. The dc-dc converter feedback network of claim 1, further comprising a feed-forward capacitor electrically coupled between said output node and said feedback node in parallel with said first resistor.

3. The dc-dc converter feedback network of claim 2, in which at least one of said resistors or said capacitor is integrated with an integrated circuit associated with said dc-dc converter feedback network.

4. The dc-dc converter feedback network of claim 2, in which all of said resistors and said capacitor are integrated with an integrated circuit associated with said dc-dc converter feedback network.

5. The dc-dc converter feedback network of claim 1, in which said hysteresis generator comprises a piece-wise curve-fitting approach.

6. A high switching frequency dc-dc converter having a feedback network comprising:
   a switching node;
   a converter output node;
   a ground node;
   a feedback node;
   means for creating a feedback signal at said feedback node that is at least partially dependant on the switching duty cycle of said switching dc-dc converter and the output voltage at said switching node;
   means for detecting a feedback voltage in said feedback node, said means comprising hysteresis; and
   means for controlling a value of said hysteresis to mitigate variations in the switching frequency of the dc-dc converter due to variations in duty cycle.

7. The dc-dc converter feedback network of claim 6, in which at least part of said feedback voltage detecting means and/or said feedback signal creating means are integrated with an integrated circuit associated with said dc-dc converter feedback network.

8. The dc-dc converter feedback network of claim 6, in which all of said feedback voltage detecting means and said feedback signal creating means are integrated with an integrated circuit associated with said dc-dc converter feedback network.

9. The dc-dc converter feedback network of claim 6, further comprising means for dynamically storing electrical current between the switching node and the output node.

10. A power management product having a dc-dc converter, the product comprising:
    a switching node;
    a converter output node;
    a ground node;
    a feedback node;
    a first resistor electrically coupled between said output node and said feedback node, said first resistor being mounted on a printed circuit board (PCB);
    a second resistor electrically coupled between said switching node and said feedback node, said second resistor being mounted on said PCB;

a third resistor coupled between said feedback node and the ground node, said third resistor being mounted on said PCB;

an integrated circuit (IC), said integrated circuit being contained in an IC package that is mounted on said PCB, said IC package being configured with electrical connection points for connecting to said switching node, said feedback node, and said ground node, which IC electrical connection points are electrically coupled to the corresponding nodes on said IC and said PCB;

a hysteretic comparator comprised in or on said IC that is associated with said dc-dc converter feedback network, an input of said hysteretic comparator being configured to be electrically coupled to said feedback node; and a hysteresis generator comprised in or on said IC for controlling a hystersis value of said hysteretic comparator, at least partially based on the switching duty cycle of the switching dc-dc converter, in a manner such that variations in switching frequency of the switching dc-dc converter due to variations in switching duty cycle are mitigated.

11. The product of claim 10, further comprising a feed-forward capacitor electrically coupled between said output node and said feedback node in parallel with said first resistor.

12. The product of claim 11, in which at least one of said resistors or said capacitor is integrated with said IC.

13. The product of claim 11, in which all of said resistors and said capacitor are integrated with said IC.

14. The product of claim 9, in which said hysteresis generator comprises a piece-wise curve-fitting approach.

* * * * *